Patented Oct. 9, 1951

2,570,253

UNITED STATES PATENT OFFICE 2,570,253

STABLE AQUEOUS DISPERSIONS OF CO-POLYMERS OF VINYL ESTERS, NEUTRAL ETHYLENIC POLYESTERS, AND ACRYLIC ACID, AND METHOD OF MAKING

William E. Lundquist, St. Paul, Minn., assignor to Minnesota Mining & Manufacturing Company, St. Paul, Minn., a corporation of Delaware No Drawing. Application October 25, 1946, Serial No. 705,815

13 Claims. (Cl. 260—29.6)

This invention relates to synthetic vinyl type polymers in emulsion form, characterized by a high degree of stability or resistance to coagulation of the emulsion on prolonged storage and/or under mechanical manipulation. In a preferred form, the emulsion comprises a high solids content, of the order of 40–60%, of a strong, flexible and rubbery, but adherent or tacky copolymer of monomers consisting principally of a vinyl ester of a short chain fatty acid and a neutral ester of an ethylene-alpha, beta-dicarboxylic acid and a saturated alcohol, stably dispersed in the form of extremely small particles in an aqueous medium.

Among the objects of this invention may be mentioned: the preparation of stable aqueous dispersions (emulsions) of vinyl polymers; the preparation of such dispersions in which the dispersed particles are of extremely small particle size; the preparation of stable aqueous dispersions of film-forming vinyl polymers, the dried films of which are resistant to softening or disintegration on subsequent contact with water; the preparation of aqueous dispersions of vinyl polymers having high solids content which do not coagulate on prolonged storage; the preparation of aqueous dispersions of vinyl polymers which are not coagulated by mechanical actions such as pumping, impregnation of paper, etc. Other objects include the preparation of stable aqueous dispersions of vinyl polymers which are difficult if not impossible to prepare by previously known emulsion methods, and the preparation of stable aqueous dispersions of strong but tacky rubbery vinyl polymers. A further object is the provision of new methods and new techniques for the preparation of vinyl type polymers, and particularly of strong but tacky rubbery vinyl type polymers. Other objects of the invention will be pointed out, or will become apparent, in the following description.

In the preparation of synthetic rubbery polymers such as rubbery copolymers of butadiene and styrene commonly designated as GR—S rubber, and other vinyl type polymers, by emulsion polymerization techniques, it has in the past been found desirable to include in the aqueous layer considerable amounts of various protective colloids. These colloids help to stabilize the dispersions and to prevent premature coagulation of the polymer. Several difficulties are inherent in this procedure. Where gelatin is used as the protective colloid, putrefaction may ensue, with coagulation of the polymer as a result. Polyvinyl alcohol as the protective colloid avoids this difficulty, but dried films of the polymer obtained from such systems still retain the water-soluble polyvinyl alcohol and hence are not as effectively water-resistant as might be desired. In many cases, even with these or other previously used aids an effective emulsion polymerization, and a stable emulsion product, is not readily available, as will hereinafter be indicated.

In the present invention, vinyl type polymers have been prepared, even from difficultly polymerizable systems, by using a modified emulsion polymerization technique. This technique, and the novel dispersions obtained thereby, will now be described in terms of specific examples. It will be understood that the examples here set forth are to be regarded simply as illustrative and not in any way as limiting the scope of the invention, which is defined by the appended claims.

In the following examples, all parts are given as parts by weight.

Example 1

| | |
|---|---|
| Water | 2400 |
| Sodium lauryl sulfate ("Duponol ME") | 24 |
| Ammonium persulfate | 14 |
| 28% solution of sodium acrylate in water | 35 |
| Vinyl acetate monomer | 700 |
| 2-butoxyethyl maleate | 700 |

Adjust the solution to a pH of 5.4. Since with commercially available raw materials the solution is normally somewhat basic, this normally requires the addition of an acid; acetic acid is found to be satisfactory. Where the solution initially is too acidic, sodium bicarbonate or an equivalent alkaline material may be employed for controlling the pH.

With continuous agitation sufficient to form and maintain an emulsion, heat the mixture to 60° C. and maintain at 60–70° C. for six hours to complete the polymerization. Cool the emulsion of polymer to room temperature, and raise the pH value from about 5.3, the value normally found at the end of the polymerization, to about 6.8 by addition of approximately 150 parts of 10% aqueous sodium bicarbonate solution. The product contains approximately 34% of non-volatile material.

The dispersion is stable both under prolonged storage and under mechanical action. For example, when applied to porous paper by means of squeeze rolls, the dispersion penetrates the paper uniformly instead of coagulating at the surface.

The 2-butoxyethyl maleate may be obtained by reacting one mol of maleic anhydride with two mols of butyl "Cellosolve," e. g. by heating in the presence of an acid catalyst such as p-toluene sulfonic acid, as will be shown more in detail hereinafter. It is a neutral ester of a saturated alcohol and an ethylene-alpha, beta-dicarboxylic acid, and may more properly be named di-(2-butoxyethyl) maleate, or di(butyl "Cellosolve") maleate, as distinguished from the acidic half-ester, namely 2-butoxyethyl acid maleate. Butyl "Cellosolve" is ethylene glycol monobutyl ether.

The sodium acrylate solution is conveniently prepared by the hydrolysis of ethyl acrylate with an equivalent amount of sodium hydroxide. Sodium acrylate itself does not polymerize, but acidification liberates acrylic acid which polymerizes very readily. At the pH here employed, acrylic acid is liberated in the emulsion and is copolymerized with the other vinyl type monomers. Although somewhat less convenient, the acrylic acid may under proper conditions, e. g. in small successive portions, be added as such to the mixture of monomers, with good results.

It was found impossible to prepare stable emulsions of copolymers of vinyl acetate and 2-butoxyethyl maleate by the previously known methods such as by the use of polyvinyl alcohol, particularly when the vinyl acetate represented considerably more than one-half of the total monomers. In all such cases investigated coagulation occurred before the polymerization could be completed. With sodium acrylate added, however, as in the present example, a stable emulsion was readily produced by simple mechanical agitation, and the stability persisted during and after polymerization.

Example 2

| | |
|---|---|
| Water | 250 |
| Sodium lauryl sulfate ("Duponol ME") | 2.5 |
| Ammonium persulfate | 1 |
| Sodium acrylate solution (28%) | 5 |
| Vinyl propionate monomer | 75 |
| n-Butyl maleate (di-n-butyl maleate) | 25 |

Adjust the solution to a pH of 5.2 and polymerize at 80–90° C.; about four hours are required. Increase the pH of the cooled emulsion to 6.8 by the addition of aqueous 10% sodium bicarbonate solution. The resulting dispersion contains about 30% solids, and is quite stable toward mechanical action.

Repeated attempts to prepare emulsion polymers from vinyl propionate and various neutral maleate or fumarate esters of higher saturated alcohols in the presence of a dispersing agent and a protective colloid such as polyvinyl alcohol were uniformly unsuccessful. The use of sodium acrylate, as in the above formula, resulted in immediate success in the preparation of stable dispersions. The polymer obtained in the present example is somewhat softer and more plastic, and also somewhat more tacky, than that of Example 1.

In a modification of this example, equal parts of vinyl propionate and di-n-butyl fumarate were successfully copolymerized in the presence of about 0.6% acrylic acid at a pH of 4.5 by heating for 3 hours at 75–80° C., and emulsion was brought to a pH of 8.8 by addition of ammonium hydroxide. The emulsion was stable over prolonged periods of aging, whereas without the added acrylic acid coagulation occurred during polymerization. This emulsion contained 50% total solids.

Example 3

| | |
|---|---|
| Water | 1700 |
| Sodium lauryl sulfate ("Duponol ME") | 17 |
| Ammonium persulfate | 15 |
| Sodium acrylate solution (28%) | 105 |
| Vinyl acetate | 1430 |
| Di(2-ethoxyethyl) maleate | 770 |

Adjust the pH to 5.1 and polymerize at 65–75° C. in 5½ hours. The resulting emulsion contains 55% solids (non-volatile constituents) and is low in viscosity. Addition of 30 parts of 18% aqueous ammonia raises the pH to 6.9, and increases both the viscosity and the mechanical stability of the emulsion. For example, after storage at room temperature for three weeks the viscosity is 4000 cps. After 16 months the pH is 4.8 and the viscosity of the still stable emulsion is 1200 cps.; addition of aqueous ammonia to a pH of 9 at this point again increases the viscosity to 3400 cps.

In this example a much higher solids content is obtained, with no reduction in the stability of the emulsion. The increased solids content as well as the stability is of advantage in the impregnation of porous papers and the like.

Example 4

Small but significant amounts, of the order of 0.5–1.0%, of other unsaturated organic acids were substituted for acrylic acid with mixtures of vinyl acetate and "Cellosolve" maleate (di-(2-ethoxyethyl) maleate), and polymerization carried out in aqueous suspension at a pH of 4.5 and temperature of 65–75° C. While a certain degree of stability was obtained in some cases, none of these emulsions had the extreme stability of the acrylic-acid-containing copolymer. For example, emulsions of vinyl type copolymers prepared from systems including maleic anhydride, methacrylic acid, and propyl acid maleate were stable for not more than about one month of normal aging, whereas acrylic acid copolymers were still found to be stable after more than a year. Where prolonged storage is required, only the latter emulsion would be classed as successful. However, where the emulsion is to be utilized shortly after its preparation, e. g. in the manufacture of films or coatings, the former compositions are also of value. Emulsions made with fumaric acid in place of acrylic acid showed some settling of the polymer on standing. Crotonic acid, in which an alkyl group is attached to the beta carbon atom, did not provide a stable emulsion; both this mixture and a control sample containing no added acid were observed to coagulate during the polymerization.

Since maleic acid is not ordinarily polymerizable with vinyl acetate or the like, even the slight increase in stability obtained by its use is quite surprising. Methacrylic acid and propyl acid maleate (half-ester of maleic anhydride and propyl alcohol) are readily polymerizable with vinyl acetate and other vinyl type monomers; but these compounds, while somewhat better than maleic acid in their effect on the stability of the resulting emulsion, are much less effective than acrylic acid, and as above indicated the resulting emulsions are entirely inadequate for many purposes.

Example 5

| | |
|---|---|
| Water | 570 |
| Sodium lauryl sulfate ("Duponol ME") | 5 |
| Ammonium persulfate | 5 |
| Sodium acrylate solution (28%) | 30 |
| Vinyl acetate | 400 |
| Di(2-ethoxyethyl) maleate | 200 |

Portions of the above formula were brought to different pH values by addition of acidic or basic materials as hereinafter noted, and polymerization carried out at 60–70° C. for 3–4 hours. The viscosity of the resulting stable emulsions was obtained after a one-month preliminary aging period.

| Reagent | pH | Viscosity | Remarks |
|---|---|---|---|
| HCl | 2.95 |  | Coagulation during polymerization. |
| NaH₂PO₄ | 3.5 | 30 | Stable. |
| HOAc+HCl | 3.5 | 100 | Do. |
| HOAc | 4.0 | 650 | Do. |
| (Control) | 4.5 | 760 | Do. |
| NaHCO₃ | 5.5 | 330 | Do. |
| NaHCO₃+NaOH | 6.6 | 330 | Do. |

The emulsions marked "stable" were all in good condition after a prolonged aging. Those having the highest initial viscosity (650 and 760 centipoise samples) were more resistant to coagulation or "breaking" by mechanical action than were those of lower viscosity, and were preferred as saturants for porous paper and for similar uses. Improved stability toward mechanical action is obtained even in these samples by increasing the pH after polymerization to a value of at least about 7, preferably from 7 to 10.

*Example 6*

| | |
|---|---|
| Water | 1800 |
| Dispersing agent | 18 |
| Water-soluble catalyst | 12 |
| Sodium acrylate solution (28%) | 60 |
| Vinyl acetate | 800 |
| Di-(2-ethoxyethyl) maleate | 600 |
| n-Butyl acrylate | 600 |

Polymerize by heating at 65–75° C. for 4 hours, at an initial pH of 4.5, then add 10% sodium bicarbonate solution to a final pH of 6.9. The emulsion is stable and has a viscosity of 110 cps. and a solids content of 46½%.

In all of these examples, a variety of dispersing agents and of water-soluble catalysts may be employed. Thus, "Santomerse 3", the sodium salt of an alkylated aryl sulfonic acid, may replace "Duponol ME", and potassium persulfate in equivalent amount may replace ammonium persulfate, for example. Variations in the type and amount of these agents will influence the stability of the emulsion, as well as the progress of the polymerization, in known manner, and the effect of such variations is not contemplated as a part of the present invention except as further influenced by the action of the polymerizable organic acid.

The amount of acrylic acid required to provide the high degree of stability experienced with the emulsions of this invention is surprisingly small. Amounts as low as 0.1 part per 100 parts of other polymerizable monomers have resulted in a degree of stability sufficient for many purposes. It is ordinarily preferred to use from about 0.5 to about 1.0 part of acrylic acid, as shown in the various examples, although amounts as high as 2 parts or somewhat higher have also been employed successfully. At considerably higher ratios of acrylic acid to principal monomers, the dispersions are found to be less desirable in a number of respects. For example, the addition of aqueous ammonia to such a dispersion has caused coagulation of the polymer; in some instances the polymer is partly or even wholly soluble in dilute alkaline solution, and is also less resistant to water.

In the above examples, acrylic acid has been added in the form of a water-soluble salt. Acidifying, whether by addition of acetic or other acid, or by means of free acid associated with the principal monomers, or by other means, releases free acrylic acid which is then capable of interpolymerizing with the other vinyl type monomers. The rate and the extent to which this interpolymerization, and the polymerization generally, proceeds appears to be a function of the pH of the system, and this property must be quite carefully controlled. Fortunately, in systems such as those herein specifically described, considerable buffering action is found, and accurate control of pH is therefore no great problem. In general, the pH must be low enough to make possible the liberation and polymerization of acrylic acid (where this constituent is added or would otherwise be present, in the form of a water-soluble salt), but not so low as to cause an unduly rapid rate of polymerization. It is found that these conditions are desirably met by adjusting the pH of the original system to within the range of about 4.0–5.5, although systems having a pH range of 3.0–6.6 have been successfully employed as shown in Example 5. After polymerization has been completed, it is desirable to increase the pH to at least about 6.0 or even somewhat higher, for the best possible stability and keeping qualities.

It will be understood that the term "vinyl type monomers" as used herein refers to compounds containing unsaturated carbon-to-carbon bonds, i. e. $>C=C<$ groupings, which are polymerizable with other similar compounds to produce vinyl type polymers (addition polymers). Vinyl acetate, vinyl propionate, dibutyl maleate, diethoxyethyl maleate, acrylic acid, etc. are examples of vinyl type monomers.

The dispersions of this invention are in general found to have an extremely small particle size. In some cases, greenish or reddish tints have been observed in the translucent dispersions, particularly when viewed by transmitted light, indicating the extremely small size of the individual polymer particles. The small size of particles is particularly valuable where it is desired to employ the dispersion as an impregnant for porous articles such as masonry, paper, leather, or the like, since the individual particles are able readily to penetrate the pores of such materials. The extreme stability of the dispersions of this invention may in fact be at least partly due to this smallness of particle size, although other factors are belived to be even more important in this respect.

One way in which the stability of these and other emulsions may roughly be estimated is by rubbing a few drops of the emulsion between the previously moistened thumb and forefinger. Emulsions of adherent film-forming polymers prepared according to this invention, when so tested, have been found to remain smooth and to be removable with water even after rubbing several times, indicating that no "breaking" or coagulation has occurred. Polymers of the same principal monomers, when prepared by prior known methods and without the addition of the organic acid, frequently coagulate during polymerization, as hereinbefore noted. Even though an emulsion may be formed of such polymers by the usual methods, it is found that the material quickly "breaks" and becomes grainy or lumpy when tested by the above-described procedure. Attempts to stabilize such emulsions by the addition of protective colloids such as water-soluble polyvinyl alcohol or the like result in the inclusion of the water-soluble material in the dried film of polymer, with attendant disadvantages.

In aging tests, stable emulsions prepared according to this invention were found to be free of coagulation or settling even after several years of storage in glass at room temperature, whereas many emulsions prepared of the same principal monomers by previous techniques and in the absence of acrylic acid coagulated within a short time.

In addition to copolymers as disclosed in the examples, polymers of a single principal monomer may also be formed. Vinyl acetate, for example, may be emulsion polymerized with 0.1-2.0% of acrylic acid to produce an effectively stabilized emulsion. However, many desirable properties are imparted to the product by the copolymerization with other principal monomers as here disclosed, and in addition certain advantages in terms of process are obtained.

For example, vinyl acetate alone polymerizes quite rapidly. In order to control the reaction, it is customary to add the monomer either continuously or in separate portions during the polymerization, which process frequently results in rather wide distribution of polymer size and in poor reproducibility. When another copolymerizable monomer such as "Cellosolve" maleate is present, particularly in amounts of at least about 20% of the total, but not more than in equimolar amounts based on the vinyl acetate, the rate of polymerization is sufficiently reduced and controlled so that, as in the examples hereinabove, all of the monomer may be added together and the reaction completed in a single step. Duplicate preparations according to this technique have been found to produce substantially identical polymers.

Furthermore, where relatively adherent but still strong and flexible synthetic polymers are desired, as in the impregnation of paper for increased wet strength or the like, these properties are obtainable in a controlled degree by the use of certain neutral copolymerizable esters as herein disclosed, in conjunction with vinyl acetate, vinyl propionate, or the like.

The neutral esters to be copolymerized with vinyl acetate or the like are readily prepared by heating a mol of maleic acid or anhydride (or of fumaric acid or other equivalent ethylene-alpha, beta-dicarboxylic acid) with an excess (more than 2 mols) of the alcohol or alcohols to be used, together with a small amount of acid catalyst, to a temperature above 100° C., and removing the water formed during the reaction by distillation. Para-toluene sulfonic acid is the preferred catalyst for this esterification and it is generally used in amounts ranging from ½-2% based on the maleic acid or anhydride or fumaric acid. In the case of alcohols which are immiscible with water, it is a very simple matter to distill alcohol and water from the reaction vessel, separate the water and return the alcohol to the reaction vessel. In the case of 2-ethoxyethanol, ("Cellosolve," ethylene glycol monoethyl ether), the water formed during the esterification may be removed through a fractionating column. Benzene, toluene, heptane or other volatile, water-immiscible solvents may be added to the reaction mixture to aid in the removal of water, particularly in the case of water-soluble lower alcohols, e. g. ethyl alcohol. In this way the reaction is readily carried to completion and a neutral ester is obtained. The excess alcohol, and the volatile solvent where such is used, are removed by distillation and the product may be used for polymerization in this crude form, or it may be purified by washing with a dilute aqueous alkaline solution to remove the catalyst and any unesterified acid, or by distillation under reduced pressure.

In those esterifications starting with fumaric acid, esters of fumaric acid are obtained. When maleic acid or anhydride is used as the starting material the conditions of esterification generally cause some of the maleic acid products to isomerize into corresponding fumaric acid derivatives so that the final product consists of a mixture of the two. It is believed, however, that the amount of fumaric acid ester present in the products prepared from maleic acid or anhydride is small, and accordingly in this specification esters prepared from maleic acid or anhydride are referred to as maleates. The maleate esters may be more completely converted into fumarate esters if desired by any of the common methods, such as by treatment with secondary amines, light, heat, acids, etc.

The nature of the alcohols thus employed has a considerable influence on the properties of the resulting polymer, and additionally has some effect on the polymerization and on the properties of the emulsion. In general, esters of the higher alcohols are somewhat more difficult to polymerize, and produce somewhat less stable emulsions and softer polymers. Conversely, esters of lower alcohols produce polymers which are frequently found to be quite hard and non-adherent. For example, diethyl maleate produces with vinyl acetate a copolymer having substantially the hardness and other properties of polyvinyl acetate itself. Increased hardness may be obtained from vinyl propionate when copolymerized with dimethyl maleate.

For the preparation of strong and flexible, adherent film-forming polymers, it is found desirable to use esters of alcohols having the general formula

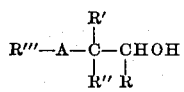

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups. The ester may be a simple ester in which both alcohol residues are the same and correspond to the above formula, or it may be a mixed ester, e. g. of one alcohol corresponding to the above formula and one other alcohol such as ethyl or propyl alcohol. Tertiary alcohols are, however, excluded, and secondary alcohols, i. e. where R in the above formula is other than hydrogen, are found to be of minor interest.

Among the compounds which may be used in forming the preferred copolymers of this invention are the following:

di (2-butoxyethyl) maleate
di (2-ethoxyethyl) maleate
di-n-butyl maleate
di (methoxyethoxyethyl) maleate
di-isoamyl maleate
di (2,2-dimethylbutyl) maleate
di-n-hexyl maleate di (2-ethylbutyl) maleate
n-Butyl-2-ethoxyethyl maleate
2-ethoxyethyl-2-butoxyethyl maleate
and equivalent esters of fumaric acid.

Harder copolymers, which may be less desirable for some purposes, may be made using lower alcohol esters such as diethyl maleate, di-isobutyl maleate, and the like.

It will also be apparent to those skilled in the art, particularly in view of the disclosure herein contained, that variations in the specific vinyl ester and in the relative proportions of vinyl ester and maleate (or fumarate) ester will exert a considerable influence on the properties of the polymer. For example, vinyl propionate will produce a somewhat softer polymer than will vinyl acetate. Increased amounts of vinyl acetate in a mixture with a maleate such as di-butoxyethyl maleate will result, in progressively firmer and somewhat less tacky polymers, as will the addition of small proportions of di-functional polymerizable cross-linking agents such as di-vinyl benzene, diallyl succinate, and the like. Other interpolymerizable monomeric materials may also be included in order to obtain special properties and advantages.

The present application is a continuation-in-part of the application filed August 17, 1944 by Waldo Kellgren and myself, Serial No. 549,963, issued as U. S. Patent No. 2,410,089, on October 29, 1946, and directed to a pressure-sensitive adhesive tape product having a polymer-unified paper backing.

My invention is particularly directed to the novel stable and non-breaking aqueous dispersions of copolymers of vinyl esters and neutral ethylenic polyesters, as herein identified and specifically claimed.

What is claimed is as follows:

1. A stable aqueous emulsion of a tough, adherent, film-forming copolymer of monomers consisting principally of (a) a vinyl ester of a saturated fatty acid of not more than three carbon atoms, (b) a neutral ester of an ethylene-alpha, beta-dicarboxylic acid and at least one saturated non-tertiary alcohol having the formula

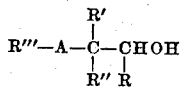

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

2. A stable aqueous emulsion of a tough, adherent, film-forming copolymer of (a) a vinyl ester of a saturated fatty acid having 2-3 carbon atoms, (b) a neutral ester of an ethylene-alpha, beta-dicarboxylic acid and at least one saturated non-tertiary alcohol having the formula

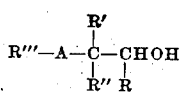

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) and from about 0.1 to about 2.0%, based on the total weight of principal monomers, of acrylic acid.

3. A stable aqueous emulsion of a tough, adherent, film-forming copolymer of (a) a vinyl ester of a saturated fatty acid having 2-3 carbon atoms, (b) from about 20% to not more than an equimolar amount, based on said vinyl ester, of a neutral ester of an ethylene-alpha, beta-dicarboxylic acid and at least one saturated alcohol having the formula

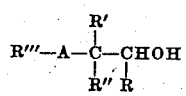

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

4. A stable aqueous emulsion of a tough, adherent, film-forming copolymer of (a) a vinyl ester of a saturated fatty acid having 2-3 carbon atoms, (b) from about 20% to not more than an equimolar amount, based on said vinyl ester, of a neutral ester of an unsaturated dicarboxylic acid having the formula

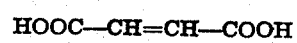

HOOC—CH=CH—COOH and at least one saturated alcohol having the formula

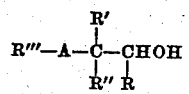

wherein R, R', and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

5. A stable aqueous emulsion of a tough, adherent, film-forming copolymer of (a) a vinyl ester of a saturated fatty acid having 2-3 carbon atoms, (b) from about 20% to not more than an equimolar amount, based on said vinyl ester, of a neutral ester of an unsaturated dicarboxylic acid having the formula

HOOC—CH=CH—COOH and at least one saturated alcohol having the formula

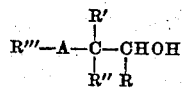

wherein R, R', and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.5 to about 1.0%, based on the total weight of principal monomers, of acrylic acid.

6. A stable aqueous emulsion of a tough, adherent, film-forming copolymer of (a) vinyl propionate, (b) from about 20% to not more than an equimolar amount, based on said vinyl propionate, of a neutral ester of an ethylene-alpha, beta-dicarboxylic acid and at least one saturated non-tertiary alcohol having the formula

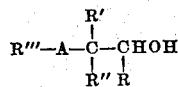

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

7. A stable aqueous emulsion of a tough, adherent, film-forming copolymer of (a) vinyl acetate, (b) from about 20% to not more than an equimolar amount, based on said vinyl acetate, of a neutral ester of an unsaturated dicarboxylic acid having the formula

and at least one saturated alcohol having the formula

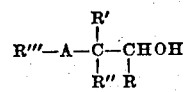

wherein R, R', and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.5 to about 1.0%, based on the sum of (a) plus (b), of acrylic acid.

8. A stable aqueous emulsion of a tough, adherent, film-forming copolymer of (a) vinyl acetate, (b) from about 20% to not more than an equimolar amount, based on said vinyl acetate, of a neutral ester of an unsaturated dicarboxylic acid having the formula

at least about half of the carboxylic acid groups of said neutral ester being esterified with a saturated beta-alkoxyethanol, and (c) from about 0.5 to about 1.0%, based on the sum of (a) plus (b), of acrylic acid.

9. A stable aqueous emulsion of a tough, adherent, film-forming copolymer of vinyl acetate and about half its weight of di-(2-ethoxyethyl) maleate, and about 0.5–1.0% of acrylic acid on the total weight of the principal monomers.

10. A film formed of the copolymer of (a) vinyl acetate, (b) from about 20% to not more than an equimolar amount, based on said vinyl acetate, of a neutral ester of an unsaturated dicarboxylic acid having the formula

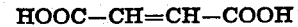

and at least one saturated alcohol having the formula

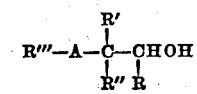

wherein R, R', and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.5 to about 1.0% based on the sum of (a) plus (b), of acrylic acid.

11. A sheet material comprising a porous paper impregnated and coated with the copolymer of (a) vinyl acetate, (b) from about 20% to not more than an equimolar amount, based on said vinyl acetate, of a neutral ester of an unsaturated dicarboxylic acid having the formula

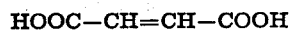

and at least one saturated alcohol having the formula

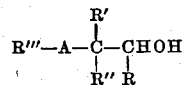

wherein R, R', and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.5 to about 1.0% based on the sum of (a) plus (b), of acrylic acid.

12. A film formed of the copolymer of (a) a vinyl ester of a saturated fatty acid having 2–3 carbon atoms, (b) a neutral ester of an ethylene-alpha, beta-dicarboxylic acid and at least one saturated non-tertiary alcohol having the formula

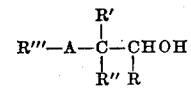

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

13. A sheet material comprising a porous paper impregnated and coated with the copolymer of (a) a vinyl ester of a saturated fatty acid having 2–3 carbon atoms, (b) a neutral ester of an ethylene-alpha,beta-dicarboxylic acid and at least one saturated non-tertiary alcohol having the formula

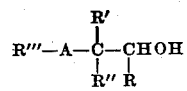

wherein R, R' and R'' are members of the class consisting of hydrogen and saturated alkyl groups, A is a member of the class consisting of oxygen, methylene, and alkyl substituted methylene groups, and R''' is a member of the class consisting of saturated alkyl and alkoxyalkyl groups, and (c) from about 0.1 to about 2.0%, based on the total weight of principal monomers, of acrylic acid.

WILLIAM E. LUNDQUIST.

(References on following page)

REFERENCES CITED

The following references are of record in the file of this patent:

UNITED STATES PATENTS

| Number | Name | Date |
|---|---|---|
| 2,047,398 | Voss et al. | July 14, 1936 |
| 2,194,354 | Crawford | Mar. 19, 1940 |
| 2,310,780 | Hanford | Feb. 9, 1943 |
| 2,324,740 | Stoops | July 20, 1943 |
| 2,339,184 | Neher | Jan. 11, 1944 |
| 2,410,089 | Lundquist et al. | Oct. 29, 1946 |
| 2,462,354 | Brubaker et al. | Feb. 22, 1949 |

OTHER REFERENCES

Ser. No. 374,298, Hermann et al. (A.P.C.), published Apr. 20, 1943.

Ser. No. 397,138, Fikentscher et al. (A.P.C.), published May 11, 1943.